Jan. 9, 1923.

H. H. LAMPERT.
COWL VENTILATOR.
FILED OCT. 5, 1921.

1,441,358

Inventor:
Henry H. Lampert
By Rummler & Rummler
Attorneys.

Patented Jan. 9, 1923.

1,441,358

UNITED STATES PATENT OFFICE.

HENRY H. LAMPERT, OF CHICAGO, ILLINOIS.

COWL VENTILATOR.

Application filed October 5, 1921. Serial No. 505,481.

*To all whom it may concern:*

Be it known that I, HENRY H. LAMPERT, a citizen of the United States of America, and a resident of Chicago, county of Cook, and State of Illinois, have invented a new and useful Improvement in Cowl Ventilators, of which the following is a specification.

The main objects of this invention are to provide an improved construction and arrangement of a closure for a cowl ventilator on a motor vehicle; to provide an improved operating mechanism for the closure whereby it may be readily manipulated by the operator from the seat usually occupied by him; to provide an operating mechanism, the handle of which can be arranged at almost any point on the instrument-board within the length of the ventilator; and to provide a device of this kind which is particularly adapted to be attached to vehicles which as originally marketed did not have a cowl ventilator.

An illustrative embodiment of this invention is shown in the accompanying drawings, in which—

Figure 1:
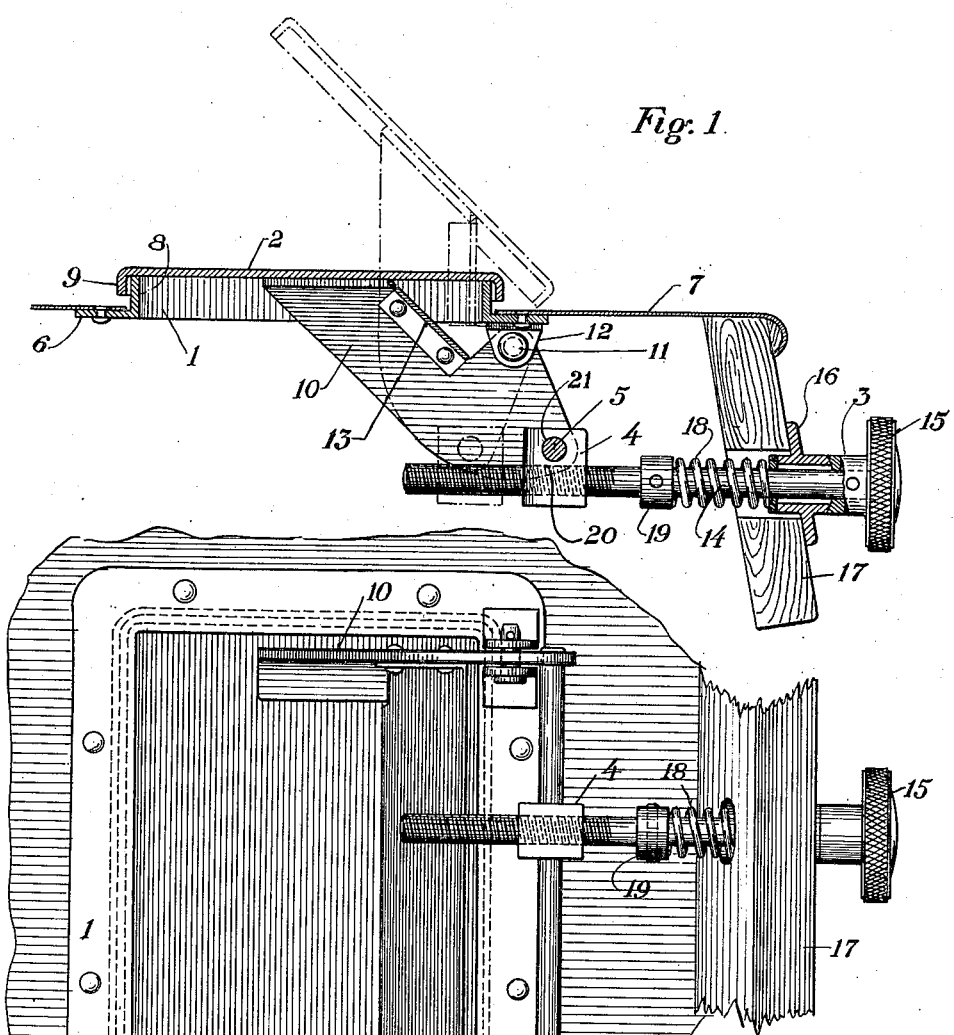
Fig. 1 is a sectional elevation of a cowl ventilator and operating mechanism for the closure therefor constructed in accordance with this invention.
Figure 2:
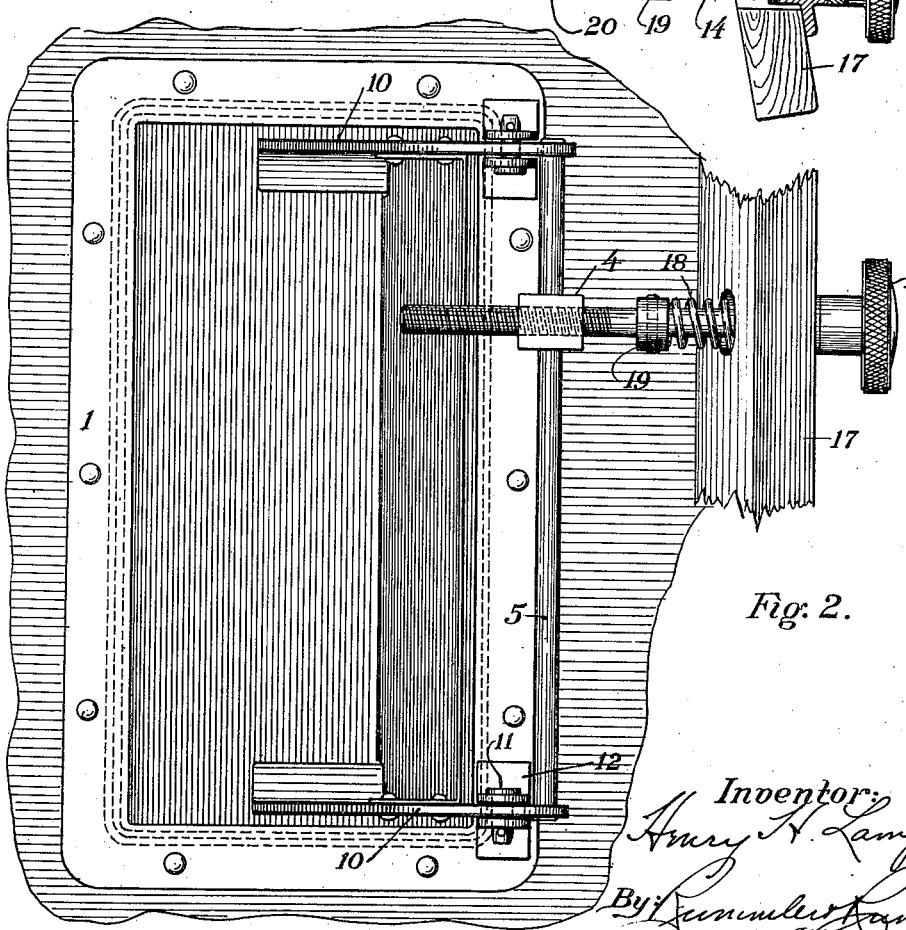
Fig. 2 is a bottom plan of the same.

A cowl ventilator and closure therefor constructed in accordance with this invention involves the use of a frame which is adapted to be secured within an opening formed in the cowl and to which a closure is hingedly connected and equipped with an operating handle connected to the closure in such a way that the handle may be extended through the instrument-board of the motor vehicle at almost any point within the length of the ventilator.

In the specific embodiment herein shown, the ventilator comprises a frame 1 upon which the closure 2 is hingedly supported and connected to an operating handle 3 by a connection embodying a block 4 and a rod 5. The construction illustrated has been particularly designed for attachment to vehicles, which as originally marketed were not provided with a cowl ventilator.

The frame 1 is a rectangular element having a horizontal flange 6 which is to be used in securing the device to a cowl 7, and a vertical flange 8, around which the perimetral flange 9 of the closure 2 fits.

The closure 2 is hinged upon the member 1 by means of arms 10 secured to the under side of the closure 2 one adjacent each end thereof and extending downwardly and rearwardly and having the upper rear ends thereof secured by pins 11 to ears 12 depending from the under side of the frame flange 6. A deflector plate 13 extends between the arms 10 with its upper lateral edge abutting against the under side of the closure 2 and disposed at such an angle to the closure that when the closure 2 is in its full open position the plate 13 is disposed substantially vertical. This deflector plate deflects air downwardly through the opening in the frame 1, which would otherwise pass out rearwardly over the cowl 7 between the closure 2 and the rear part of the frame 1.

The operating handle 3 comprises a rod 14, the forward end of which is threaded, and the rear end of which has a knurled head or handle 15 secured thereto. The rod is rotatably supported on a fitting 16 which is adapted to be secured in any suitable manner upon the instrument-board 17. The spring 18 bearing between the fitting 16 and a collar 19, rigidly secured upon the rod 14, firmly holds the parts against rattling. The connection 4 by which the operating handle 3 is connected to the closure 2, is in the form of a block having a threaded bore 20 extending therethrough, into which the threaded end of the rod 14 is adapted to be screwed, and having a transversely disposed bore 21 extending therethrough to receive the rod 5. The rod 5 extends longitudinally of the closure 2, and is secured at its ends to the lower rear ends of the arms 10. By means of this sliding connection to the rod 5, the operating handle 3 may be arranged on the instrument-board 17 at almost any point within the length of the rod 5. This is particularly desirable when this device is to be attached to motor cars which as marketed were not equipped with a cowl ventilator. The position of the other instruments upon the instrument-board 17 varies in different makes of cars, and it is, therefore, necessary to locate the operating handle for the cowl ventilator in relatively different positions on different cars.

The operation of the device herein shown and described is more or less obvious from the foregoing description. To raise the ventilator closure 2 it is merely necessary to turn the head 15 in a clockwise direction, whereupon the rotation of the threaded rod 14 in the bore 20 of the block 4 causes the arms 10 to shift the closure upwardly toward the position shown in dotted outline in Fig. 1. When it is desired to close the ventilator the head or handle 15 is rotated in a counter-clockwise direction. When the closure is down against the flange 8 the handle 15 can be turned sufficiently to place a tension on the spring 18 and insure the closure and all parts being held in position against rattling.

Although but one specific embodiment of this invention has been herein shown and described, it will be understood that numerous details of the construction shown may be altered or omitted without departing from the spirit of this invention as defined by the following claims.

I claim:

1. A cowl ventilator comprising a frame providing an opening, a closure for said opening, a pair of arms secured to the under side of said closure one adjacent each end thereof intermediate the lateral edges and extending downwardly and inwardly through said opening, said arms being pivotally connected at their upper rear ends to the under side of said frame, a rod extending longitudinally of said closure and connected at its ends to the lower rear ends of said arms, an operating handle, and means connecting said operating handle to said rod, said means being adjustable along said rod whereby said operating handle may be located at any point between said arms.

2. A cowl ventilator comprising a frame providing an opening, a closure for said opening, a pair of arms secured to the under side of said closure one adjacent each end thereof intermediate the lateral edges and extending downwardly and inwardly through said opening, said arms being pivotally connected at their upper rear ends to the under side of said frame, a rod extending longitudinally of said closure and connected at its ends to the lower rear ends of said arms, an operating handle in the form of a rod extending transversely to said first mentioned rod and having the forward end thereof threaded, and a block slidably mounted on said first-mentioned rod and having a threaded bore to receive said operating handle.

3. A cowl ventilator comprising a frame providing an opening, a closure for said opening hinged on said frame, a part secured to the under side of said closure and disposed parallel to the axis of said hinge and extending substantially the entire length of said closure, an operating handle, and means connecting said operating handle to said part whereby said handle may be set at any point along the length of said closure.

4. A cowl ventilator comprising a frame providing an opening, a closure for said opening hinged on said frame, a rod supported on the under side of said closure and extending longitudinally thereof substantially the entire length of said closure, an operating handle in the form of a rod extending transversely to said first-mentioned rod and having the forward end thereof threaded, a block slidably mounted on said first-mentioned rod and having a threaded bore adapted to receive said threaded operating handle.

Signed at Chicago this first day of October, 1921.

HENRY H. LAMPERT.